Figure 1:
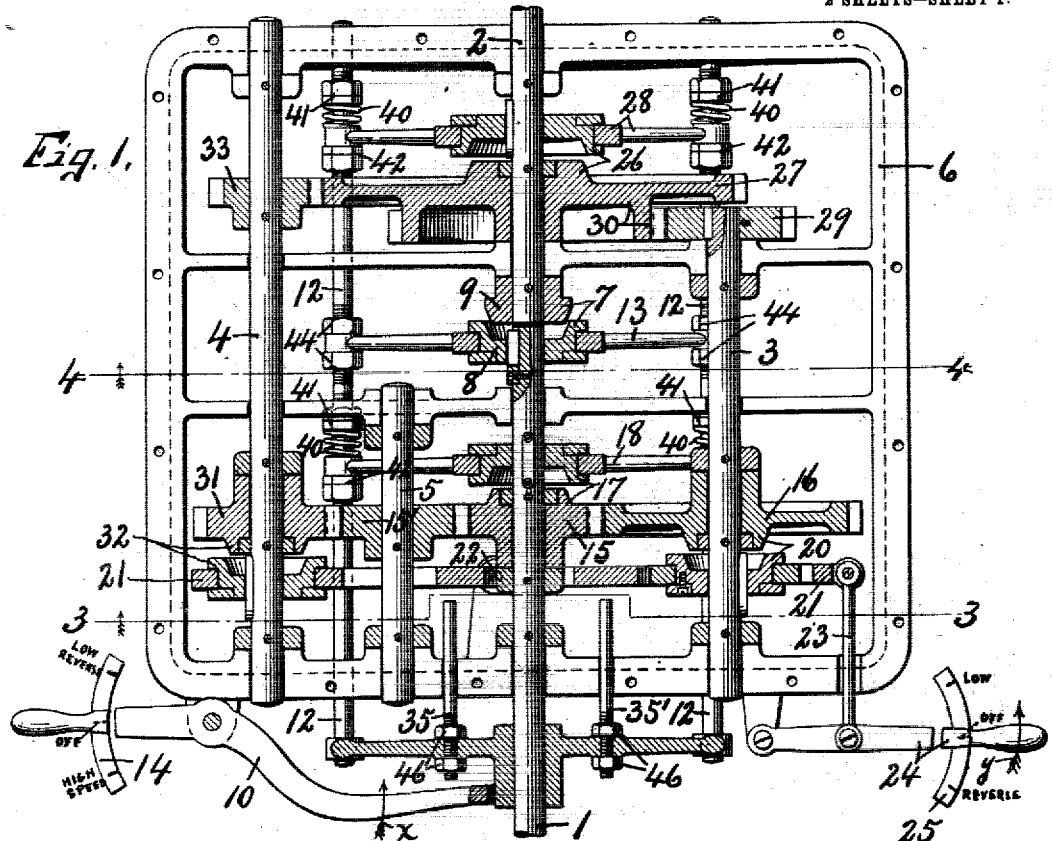

No. 836,103. PATENTED NOV. 20, 1906.
F. H. EVERHART.
VARIABLE SPEED POWER TRANSMITTING MECHANISM.
APPLICATION FILED OCT. 6, 1905.

2 SHEETS—SHEET 1.

WITNESSES:
B. E. Robinson
H. E. Chase

INVENTOR:
F. H. Everhart
BY:
Howard P. Denison
ATTORNEY.

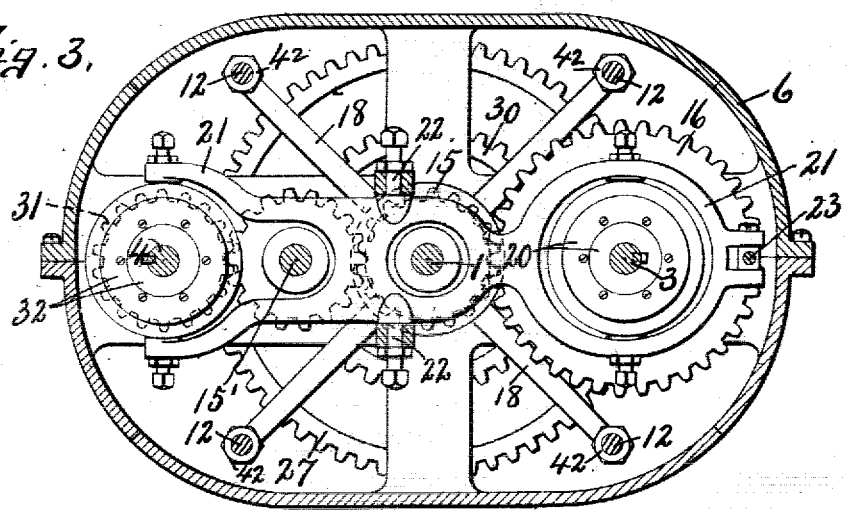

UNITED STATES PATENT OFFICE.

FOIST H. EVERHART, OF CLYDE, NEW YORK.

VARIABLE-SPEED POWER-TRANSMITTING MECHANISM.

No. 836,103.  Specification of Letters Patent.  Patented Nov. 20, 1906.

Application filed October 6, 1905. Serial No. 281,357.

*To all whom it may concern:*

Be it known that I, FOIST H. EVERHART, of Clyde, in the county of Wayne, in the State of New York, have invented new and useful Improvements in Variable-Speed Power-Transmitting Mechanism, of which the following, taken in connection with the accompanying drawings, is a full, clear, and exact description.

This invention relates to improvements in power-transmitting devices, and refers more particularly to variable-speed and reverse-driving mechanisms as specifically applied to the transmission of power from the engine to the running-gear of a vehicle.

I am aware that it is common in the art to provide speed-changing and reverse-drive mechanisms in which certain gears or toothed wheels are slidable into and out of mesh with similar gears or wheels with the following attendant difficulties: first, that the teeth of the gears which it may be desired to intermesh are frequently out of intermeshing registration, thereby making it impossible without extra manual effort to slide the movable gear into mesh with its companion; second, that when one of the gears, which may be revolving at a high rate of speed, is brought into mesh with its companion gear the inertia which it has to overcome in imparting motion to the driven part frequently causes the stripping of the teeth and always produces a sudden or jerking movement of the vehicle, either of which effects causes undue strains upon other parts and mechanisms which may be in operative connection therewith; third, that in all of the devices with which I am familiar it is possible to bring two or more mechanisms whose actions are opposed into operation at the same time by careless manipulation of the manuals or levers by which such mechanisms are controlled, which causes an undue strain upon the oppositely-acting parts, if not resulting in serious and expensive damage to the machine. The primary object of my invention is to overcome these difficulties by always maintaining the toothed gears in mesh with their companions and by providing means whereby any liability of bringing into simultaneous action any mechanisms whose operation is opposed is obviated. In order that this may be clearly understood, it may be stated that I employ in my device what may be termed "high" and "low" speed and "reverse-drive" mechanisms, either of which is designed to be brought into action individually, but no two simultaneously; and one of the specific objects of my invention is to make it impossible to bring either the low-speed or reverse-drive mechanism into action simultaneously with the high-speed mechanism or to bring the high-speed mechanism into action while the low-speed or reverse-drive mechanisms are in operation or to bring the reverse-drive and low-speed mechanism into simultaneous action, or vice versa.

A still further object is to reduce the number of parts necessary to carry out the various operations previously described and to avoid the use of planetary-gear actions and similar power-consuming mechanisms by making all of the gears which are employed in my construction of the spur type, permanently intermeshing with their companion gears, and to rely upon suitable friction-clutches for throwing into and out of action the several mechanisms previously described.

Other objects and uses will appear in the following description.

Figure 2:
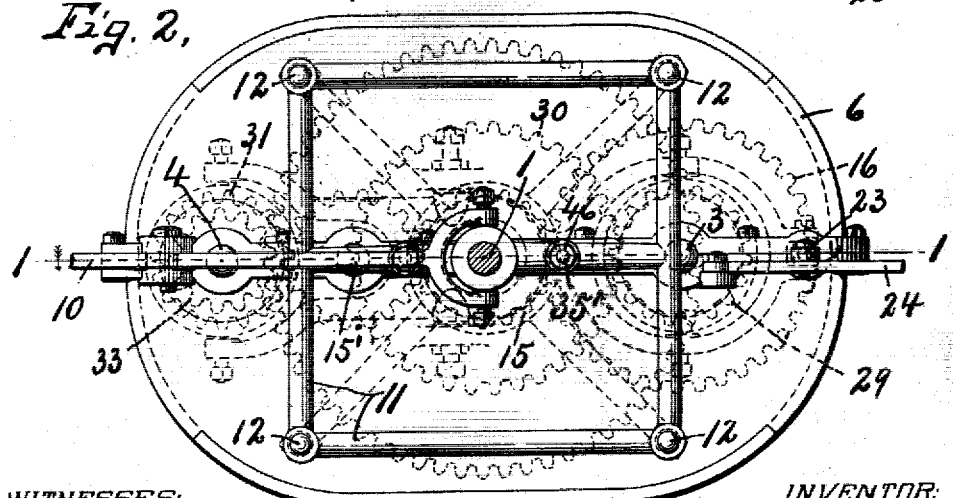

In the drawings, Figure 1 is a horizontal sectional view of a variable-speed power-transmitting device embodying the features of my invention. Fig. 2 is an end view of the device seen in Fig. 1. Fig. 3 is a sectional view taken on line 3 3, Fig. 1. Fig. 4 is a transverse sectional view taken on line 4 4, Fig. 1.

In order to clearly demonstrate the practicability of my invention, I have shown it somewhat diagrammatically or developed and as consisting, essentially, of driving and driven shafts 1 and 2, auxiliary shafts 3 and 4, one at each side of the axis of the driving and driven shafts, an additional shaft 5 intermediate but parallel with the shafts 1 and 4, and a suitable framework or casing 6, adapted to contain and retain the various intermeshing gears, clutches, and clutch-operating mechanisms presently described.

When it is desired to drive the vehicle under a high speed, the drive-shaft 1, which may be the crank-shaft of the engine, is connected directly to the driven shaft 2 through the medium of a clutch 7, composed of a sliding member 8, feathered upon the inner end of the shaft 1, and a second member 9, which is permanently secured to the adjacent end of the driven shaft 2, so that the clutch-section 8 not only rotates positively with the shaft 1, but is movable axially into and out of frictional engagement with the clutch-section 9 of the driven shaft 2, whereby when the clutch is operated the same speed of rotation as the driving-shaft is imparted to the driven shaft, thus producing a high-speed frictional driving medium for the forward movement of the vehicle.

The operation of the clutch 7 may be controlled by any desired form of manual or pedal, as a lever 10, Figs. 1 and 2, such lever being operatively connected to the sliding member 8 of the clutch 7 by a sliding yoke, consisting of a head or cross-bar 11, movable axially on the shaft 1, and parallel bars or rods 12 at opposite sides of the shaft 1 and connected to each other and to the sliding clutch member 8 by means of a second cross-bar 13.

The lever 10 is movable along a toothed segment 14 and is shown in position for holding all of the clutch members out of operative position, and it is clearly evident that by rocking the lever 10 inwardly or in the direction indicated by arrow $x$ the head 11 and sliding rods 12, together with the cross-bar 13, will operate to slide the clutch member 8 endwise into engagement with the clutch member 9, thereby frictionally locking the adjacent ends of the two shafts 1 and 2 together for high speed, or by reversing the action of the lever to the normal position (seen in Fig. 1) the driving and driven shafts are disconnected, leaving the engine free from operative connection with the running-gear of the vehicle.

Loosely mounted upon the driving-shaft 1 is a pinion 15, meshing with a gear 16, which is loosely mounted upon the shaft 3 and of somewhat larger diameter than the pinion 15.

A clutch 17 is also mounted upon the shaft 1 and has one of its members rigidly secured to the gear 15 and its other member slidable axially or feathered upon the driving-shaft 1, so as to rotate therewith, and is actuated endwise by a cross bar or arm 18, similar to the arm or bar 13 and having its outer ends connected to the rods 12.

Mounted upon the shaft 3 is a clutch 20, having one of its members rigid with the gear 16 and its other member slidable lengthwise of the shaft 3 and feathered thereon to rotate therewith.

The sliding member of the clutch 20 is connected to and actuated by a transverse lever 21, which is pivoted at 22 and has one end connected by a link 23 to a hand-lever 24, the latter being movable along a segment 25, which serves to hold the lever in its inoperative position.

It will be observed that the parts of the clutch 20 are normally disconnected and that by rocking the lever 24 in the direction indicated by arrow $y$ the sliding clutch member of said clutch 20 is forced into engagement with the clutch-section of the gear 16, to which rotary motion is imparted by the gear 15, which in turn is locked to the driving-shaft 1 by the operation of the clutch 17 through the medium of the lever 10 and sliding yoke connected thereto.

Mounted on the driven shaft is an additional friction-clutch 26, having one of its members rigidly secured to a gear 27 and its other member slidable axially on the driven shaft 2 and actuated by an arm 28, which in turn is connected to the sliding bars or rods 12 of the yoke previously referred to.

The clutches 17 and 26 are opposed in their action to that of the high-speed clutch 7—that is, the slidable sections of all of the clutches on the shafts 1 and 2 are connected to the sliding rods 12 of the yoke in such relative arrangement that when the high-speed clutch 7 is thrown into action by the movement of the lever 10 in one direction the sliding sections of the clutches 17 and 26 are simultaneously thrown out of action, and, on the other hand, when the movable sections of the clutches 17 and 26 are thrown into action for purposes hereinafter described the high-speed clutch 7 is thrown out of action, thereby obviating any liability of simultaneously actuating any two of the three driving mechanisms previously specified into action.

Rigidly secured to the inner end of the shaft 3 is a pinion 29, meshing with a somewhat larger gear 30, which is loose on the driven shaft 2 and is preferably rigid with the gear 27, so that any motion transmitted to the shaft 3 and gear 29 is imparted to the gear 30 and incidentally to the gear 27, which is rigid therewith and upon which one of the clutch members is secured.

It is now clear that when it is desired to operate the vehicle at comparatively low speed it is simply necessary to throw the clutches 17 and 26 into operative position, thereby frictionally locking the driving-shaft 1 to the pinion 15 and similarly locking the driven shaft 2 to the gear 30, during which operation the clutch 7 for the high speed is thrown out of action, and now by throwing the clutch 20 into action the gear 16, to which rotary motion is imparted by the pinion 15, is locked to the shaft 3, thus imparting rotary motion to said shaft 3 and also to the pinion 29 and gear 30, the latter gear being locked to the driven shaft 2 by the clutch 26, as previously stated.

It is now obvious that owing to the relative sizes of the intermeshing gears 15 and 16 and also to the similar relation between the gears 29 and 30 the shaft 2 will be driven at a much less speed than the driving-shaft 1.

I have now described the operation of the mechanism for propelling the vehicle at different speeds, (as high and low,) and I will now proceed to describe the mechanism for effecting the reverse drive of the vehicle.

Mounted upon the intermediate shaft 5 is an idle gear 15', meshing with and receiving rotary motion from the driving-gear 15 and transmitting similar motion to another gear 31, which is loosely mounted upon the shaft 4. A clutch 32 is also mounted upon this shaft 4, one of the clutch-sections being secured to the gear 31, while the other section is feathered upon the shaft 4 to rotate therewith and at the same time having an axial movement into and out of engagement with the clutch-section on the gear 31.

The sliding section of the clutch 32 is connected to and actuated by the lever 21 and is located at the opposite side of the lever-pivot 22 from that upon which the movable section of the clutch 20 is located, so that when one clutch is positively thrown into action the other is thrown out of action, thus making it impossible to bring both the reverse and low-speed driving mechanisms into operation at the same time.

Secured to the shaft 4 is an additional pinion 33, which meshes with the comparatively large gear 27, the latter being loose upon the driven shaft 2, and it is now obvious that by throwing the clutches 17 and 26 into action by means of the lever 10 the gear 15 will be locked to the driving-shaft 1, and thereby transmit rotary motion from said driving-shaft to the pinion 31 on the shaft 4, and that simultaneous with this action of the clutch 17 the driven shaft 2 is frictionally locked to the gear 27 and the clutch 7 is thrown out of action. Now by throwing the clutch 32 into action through the medium of the lever 24, link 23, and lever 21 the low-speed clutch 20 is thrown out of action and the shaft 4 is simultaneously locked to the pinion 31, which, as previously stated, is now positively driven from the driving-shaft through the medium of the gears 15 and 15', thereby positively driving the shaft 4 and pinion 33, which in turn rotates the gear 27 and driven shaft 2, to which said gear 27 is locked and driven in the direction opposite to that in which the driving-shaft is rotated, and thus reversing the operation of the running-gear of the vehicle. (Not shown.)

I have now described the operation of the high and low speed and reverse driving mechanisms and have also called attention to the relative arrangement and operation of the clutches 7, 17, and 26, all of which are mounted upon and actuated by the same sliding yoke, but in such manner that when the clutch 7 is thrown into action the clutches 17 and 26 are thrown out of action and when these last two named clutches are thrown into action the high-speed driving-clutch 7 is positively thrown out of action, thus making it impossible to bring any two of the three driving mechanisms into action at the same time. I have also described clearly how it is impossible to throw the clutches 20 and 32 into action at the same time, and I will now proceed to describe means for preventing the action of either of the clutches 20 or 32 when the high-speed clutch 7 is in action, and also for preventing the action of the high-speed clutch when either of the first-named clutches are in action. As shown in the drawings, this means consists, primarily, of a pair of pins or studs 35 and 35', projecting inwardly from the head 11 of the yoke, one at each side of the pivot 22 of the lever 21 and each having its inner end disposed in the swinging path of said lever 21, but terminating a sufficient distance therefrom to permit the yoke 1 to be moved inwardly or endwise far enough to bring the clutch-section 8 of the high-speed clutch 7 into firm frictional engagement with its companion section 9 for locking the driving to the driven shaft.

As previously stated, the clutches which are controlled by the yoke 11 and lever 10 and also those which are controlled by the lever 21 and its operating manual 24 are shown as disconnected or out of action, leaving the driving-shaft 1 free to rotate independently of the driven shaft or any of the gears by which motion is transmitted from the driving to the driven shaft.

It will be understood from the foregoing statement that the yoke 1 is connected to the movable members of the clutches 7, 17, and 26 and is shown in an intermediate position and is capable of movement from such position for the purpose of throwing said movable members of the clutches 7, 17, and 26 into and out of action. It therefore follows that when the lever 10 is rocked in the direction indicated by arrow $x$ from the intermediate position shown the inner ends of the studs 35 and 35' will be brought into sufficient proximity to the adjacent face of the lever 21 at opposite sides of its pivot 22 to restore said lever and the clutch-sections carried thereby to their normal inactive positions before the high-speed driving-clutch 7 is brought into action, and, on the other hand, should the lever 10 and high-speed driving-clutch 7 be inadvertently left in their active positions and any attempt made to rock the lever 21 in either direction by means of the manual 24 to throw either of the clutches 20 or 32 into action then the outwardly-swinging side or arm of the lever 21 would engage one or the other of the arms 35 or 35' and through such medium force the yoke and clutch, as 7, out of action when the lever 10 is unlocked. If, however, such lever 10 and yoke were locked in operative position, the arms 35 and 35' would engage and prevent the action of the lever 21. Furthermore, when the clutches 17 and 26 are thrown into action it is obvious that the studs 35 and 35' are drawn farther away from the adjacent face of the lever 21, leaving ample space or clearance for the operation of said lever in either direction to force either of the clutches 20 and 32 into operative position.

It is of course obvious that the friction-clutches will wear more or less in use, and in order to take up this wear and provide for the positive engagement of the clutch-sections each with its companion I provide yielding buffers 40 between the outer ends of the cross-arms 18 and 28 and adjustable abutments 41 on the sliding rods 12, the outer ends of said arms being spring-pressed against additional adjustable abutments 42, whereby the arms 18 and 28 and the sliding clutch-sections which are connected thereto may be properly positioned to firmly engage their companion sections, so that if one of the sliding sections should engage its companion before the engagement of the other sliding section the spring-buffers 40 would allow a continued movement of the yoke to bring the delinquent section into operative engagement with its companion.

The cross-arm 13 for operating the sliding clutch-section 8 is held at its ends between adjustable lock-nuts 44 on the rods 12, which serve to permit the proper adjustment of the section 8 with reference to its companion section 9. In like manner the studs 35 and 35' are adjustably secured by lock-nuts 46 to the cross-head 11 of the yoke to allow for the proper adjustment of said studs with reference to the adjacent face of the lever 21.

In operation, assuming that it is desired to transmit rotary motion directly from the driving-shaft 1 to the driven shaft 2 at the same speed as the driving-shaft, it is then necessary to rock the lever 10 in the direction indicated by arrow $x$, thereby moving the head 11 and rods 12 endwise in the same direction to force the high-speed clutch-section 8 into frictional engagement with its companion 9, whereby the same speed of motion is transmitted from the driving-shaft 1 to the driven shaft 2, and at the same time the clutches 17 and 26 on the shafts 1 and 2 are thrown further out of action, it being understood that when this high-speed clutch 7 is thus thrown into action all of the gears of the low speed and reverse drive are idle or at rest.

When it is desired to change from high to reverse low speed, the lever 10 is rocked in the opposite direction from that indicated by the arrow $x$, thereby drawing the yoke in the same direction to disengage the high-speed clutch members 8 and 9 and simultaneously throw the clutches 17 and 26 into action, thus locking the driving-shaft to the pinion 15 and also locking the driven shaft 2 to the gear 30, at the same time drawing the pins or studs 35 and 35' backwardly away from the lever 21. Now by operating the lever 24 in the direction indicated by arrow $y$, the adjacent end of the lever 21 is rocked in the same direction, thereby throwing the clutch 20 into action to lock the gear 16 to the shaft 3, and inasmuch as the gear 16 is in mesh with the now rotating pinion 15 it is evident that rotary motion is imparted to the shaft 3 and pinion 29, which is secured to said shaft 3 and meshes with the gear 30, which has been previously described, is now locked to the driven shaft 2, so that a slower rotary motion is imparted to the driven shaft in the same direction as the driving-shaft for slow-speed head.

When it is desired to reverse the direction of movement of the vehicle, as in running it backward, the lever 10 and clutches 17 and 26 are allowed to remain in the same active position as last described, and the lever 24 is then rocked in the opposite direction to that indicated by the arrow $y$, thereby rocking the lever 21 to disengage the members of the clutch 20 and to throw into action the clutch 32, thereby locking the shaft 4 to the gear 31, which is now being driven by the gear 15 through the medium of the idler 15'. This rotation of the shaft 4 also positively rotates the gear 33, which is secured to said shaft 4 and imparts rotary motion to the gear 27, which is now locked to the shaft by the clutch 26, whereby rotary motion in an opposite direction from that in which the driving-shaft is driven is imparted to the driven shaft 2, the speed of which reverse motion depends upon the relative sizes of the gears 33 and 27.

If through inadvertence the high-speed clutch 7 should be left in operative position when it is desired to change to the low speed or reverse drive, the inner ends of the studs 35 and 35' would then be in close proximity to the adjacent face of the lever 21. When in the act of rocking the lever 21 in either direction to throw either of the clutches 20 or 32 into action, said lever would encounter one or the other of the studs 35 or 35', and thereby force the yoke upon which the movable clutch-section 8 is mounted backwardly out of action. On the other hand, if the lever 10 were locked in position to hold the clutch 7 in action, then the studs 35 and 35', which would be held in their innermost position, would engage and prevent the rocking action of the lever 21. On the other hand, should one or the other of the clutches 20 or 32 be in operative position when it is desired to change to the high speed the act of moving the yoke inwardly to engage the clutch-sections 8 and 9 with each other would cause the inner ends of the studs 35 and 35' to engage the adjacent face of the lever 21 at opposite sides of its pivot, and thereby restore such lever 21 to its normal or inoperative position.

What I claim—

1. In a variable-speed power-transmitting device, a driving-shaft and a driven shaft arranged end to end, direct-driving mechanism between said shafts and including a clutch, mechanism for transmitting low speed from the driving-shaft to the driven shaft and including a clutch, a sliding shift-rod connected to said clutches for throwing one into action when the other is thrown out of action, and an additional clutch operable independently of the first-named clutches for controlling the action of the low-speed driving mechanism.

2. In a variable-speed power-transmitting mechanism, a driving-shaft and a driven shaft, mechanism including a clutch for direct drive from the driving to the driven shafts, additional mechanism including a clutch for transmitting reverse motion from the driving to the driven shaft, means for simultaneously throwing one clutch into action and the other out of action, and additional means operable independently of the first-named clutches for controlling the action of the reverse-drive mechanism.

3. In a variable-speed power-transmitting device, a driving-shaft and a driven shaft, a clutch for direct drive from the driving to the driven shaft, low-speed reverse-driving mechanism including a clutch for transmitting motion from the driving to the driven shaft around the first-named clutch, means for simultaneously throwing one of said clutches into action and the other out of action, said low-speed reverse-driving mechanism including an additional clutch operable separately from the first-named clutches.

4. In a variable-speed power-transmitting device, a driving and a driven shaft, direct-driving mechanism including a clutch between said shafts, low-speed driving mechanism for transmitting motion from the driving to the driven shaft and including a pair of clutches, one on the driving-shaft and one on the driven shaft, means for simultaneously throwing the direct-drive clutch out of action and said pair of clutches into action, said low-speed driving mechanism including a clutch operable separately from the other clutches.

5. In a variable-speed power-transmitting device, a driving-shaft and a driven shaft both rotating about a common axis, a friction-clutch and its actuating means for connecting said shafts to rotate together, separate gears loosely mounted upon said shafts, additional friction-clutches, one on each of said shafts for locking each of said gears to its shaft to rotate therewith, mechanism for transmitting lower-speed motion from the gear on the driving-shaft to the gear on the driven shaft, a second gear on the driven shaft, additional means for transmitting reverse motion from the gear on the driving-shaft to the second gear on the driven shaft, said gears on the driven shaft being locked thereto by the same clutch, each of said mechanisms including a friction-clutch, and means to throw both latter clutches into and out of action alternately.

6. In a variable-speed power-transmitting mechanism, a driving-shaft and a driven shaft both rotating about a common axis, a direct-drive clutch for locking said shafts to each other whereby the same speed of motion is transmitted from the driving to the driven shaft, gears loose on said shafts, clutches, one for each gear, each clutch locking its gear to its shaft, means for throwing the last-named clutches into action and simultaneously throwing the first-named clutch out of action, mechanism for transmitting rotary motion from the gear on the driving-shaft to the gear on the driven shaft at a reduced speed, said mechanism including an auxiliary clutch, an additional gear loose on the driven shaft, additional mechanism for transmitting reverse rotary motion from the gear on the driving-shaft to the additional gear on the driven shaft, said additional mechanism including a second auxiliary clutch, means separate from the first-named means to operate the auxiliary clutches alternately, and further means brought into action by the operating means for the direct-drive clutch to lock the operating means for the auxiliary clutches in their inoperative positions when the direct-drive clutch is thrown into action.

7. In a variable-speed power-transmitting mechanism, a driving-shaft and a driven shaft both rotating about a common axis, a friction-clutch for locking said shafts to each other, actuating means for said clutch, mechanism for transmitting rotary motion from the driving-shaft to the driven shaft at a reduced speed, said mechanism including a friction-clutch, additional mechanism for transmitting reverse motion from the driving to the driven shaft, said additional mechanism including a friction-clutch, a lever pivoted intermediate its ends and connected at opposite sides of its pivot to said additional clutches, whereby each is thrown out of action when the other is thrown into action, and further means brought into action by the operating means for the first-named clutch for locking said lever against rocking movement.

8. In a device of the class described, a driving element and driven element, a direct drive clutch for connecting said elements, mechanism for transmitting reverse motion from the driving to the driven element, and including a clutch, means for throwing the first-named clutch into and out of action, separate means for throwing the second clutch into and out of action, and additional means actuated by the last-named means for throwing the first-named clutch out of action when the second clutch is thrown into action.

9. In a variable-speed power-transmitting device, a driving element and a driven element, a direct-drive clutch for locking said elements together to rotate at the same speed, mechanism actuated by the driving element and including a clutch for transmitting lower speed to the driven element, means for throwing the last-named clutch into and out of action, separate means actuated by the first-named means to throw the first-named clutch out of action when the last-named clutch is thrown into action.

10. In a variable-speed power-transmitting device, a driving-shaft and a driven shaft arranged end to end, mechanism for transmitting reverse motion from the driving to the driven shaft and including two separate clutches, and separate actuating means for each clutch, and additional means operated by one of the actuating means to simultaneously shift the other actuating means, whereby both clutches are thrown out of action at the same time.

11. In a variable-speed power-transmitting device, a high-speed clutch, a low-speed clutch and a reverse-drive clutch, means to throw the high-speed clutch into action, separate means to alternately throw the low-speed and reverse-drive clutches into action, and additional means actuated by the first-named means to lock the last-named means against operative action.

12. In a variable-speed power-transmitting device, a driving-shaft and a driven shaft, a direct-drive clutch to lock said shafts, gears each loose on one of said shafts, additional clutches each locking one of the gears to its shaft, and a sliding yoke for throwing the first-named clutch into action, and simultaneously throwing the last-named clutches out of action.

13. In a variable-speed power-transmitting device, a driving-shaft and a driven shaft, a high-speed friction-clutch and its operating means to lock said shafts for simultaneous rotation, a low-speed clutch and a reverse-drive clutch, a lever connecting said clutches to throw each into and the other out of action, and means actuated by said operating means for the high-speed clutch when the latter is thrown into action to prevent the action of said lever and clutches controlled thereby.

14. A variable-speed power-transmitting device comprising driving and driven shafts, a gear loose on the driving-shaft, gears loose on the driven shaft, a high-speed clutch for locking said shafts to rotate at the same speed independently of said gears, a second clutch for locking the driving-shaft gear to its shaft, a third clutch for locking the driven-shaft gears to their shaft, mechanism for transmitting lower speed from the gear on the driving-shaft to one of the gears on the driven shaft, additional mechanism for transmitting reverse motion from the gear on the driving-shaft to the other gear on the driven shaft, said low-speed and reverse-drive mechanisms, each including an auxiliary clutch, and means for throwing the high-speed clutch into action and for simultaneously throwing the second and third clutches out of action.

15. A variable-speed power-transmitting device comprising driving and driven shafts, a gear loose on the driving-shaft, additional gears loose on the driven shaft but rigid with each other, a high-speed clutch for locking said shafts to rotate at the same speed independently of said gears, a second clutch for locking the driving-shaft gear to its shaft, a third clutch for locking the driven-shaft gears to their shaft, low-speed mechanism for transmitting rotary motion from the gear on the driving-shaft to one of the gears on the driven shaft, reverse-drive mechanism for transmitting rotary motion from the gear on the driving-shaft to the other gear on the driven shaft, said mechanism each including an auxiliary clutch, means for throwing the high-speed clutch into action and for simultaneously throwing the second and third clutches out of action, and means separate from the last-named means for throwing the auxiliary clutches into and out of operative connection with their respective mechanisms.

16. A variable-speed power-transmitting device comprising driving and driven shafts, a gear loose on the driving-shaft, additional gears loose on the driven shaft, a high-speed clutch for locking said shafts to rotate at the same speed independently of said gears, a second clutch for locking the driving-shaft gear to its shaft, a third clutch for locking the driven-shaft gears to their shaft, low-speed mechanism for transmitting rotary motion from the gear on the driving-shaft to one of the gears on the driven shaft, reverse-drive mechanism for transmitting rotary motion from the gear on the driving-shaft to the other gear on the driven shaft, each of said mechanisms including an auxiliary clutch, a lever connected to the low-speed and reverse-drive clutches, whereby each is thrown out of action when the other is thrown into action, means for throwing the high-speed clutch into and the second and third clutches out of action simultaneously, and additional means actuated by the last-named means for locking said lever from action when the high-speed clutch is in action.

In witness whereof I have hereunto set my hand this 26th day of September, 1905.

FOIST H. EVERHART.

Witnesses:
H. E. CHASE,
MILDRED M. NOTT.